US012295906B2

(12) United States Patent
Fisher

(10) Patent No.: US 12,295,906 B2
(45) Date of Patent: May 13, 2025

(54) PORTABLE SAUNA ASSEMBLY

(71) Applicant: Eric Fisher, Wellington, CO (US)

(72) Inventor: Eric Fisher, Wellington, CO (US)

( * ) Notice: Subject to any disclaimer, the term of this patent is extended or adjusted under 35 U.S.C. 154(b) by 134 days.

(21) Appl. No.: 18/136,574

(22) Filed: Apr. 19, 2023

(65) Prior Publication Data

US 2024/0350357 A1 Oct. 24, 2024

(51) Int. Cl.
*A61H 33/06* (2006.01)

(52) U.S. Cl.
CPC ..... *A61H 33/063* (2013.01); *A61H 2033/061* (2013.01); *A61H 2201/0157* (2013.01); *A61H 2201/0161* (2013.01)

(58) Field of Classification Search
CPC .................................................... A61H 33/063
See application file for complete search history.

(56) References Cited

U.S. PATENT DOCUMENTS

| | | | | |
|---|---|---|---|---|
| 3,351,956 A | | 11/1967 | Thoner | |
| 3,945,058 A | | 3/1976 | Gardner | |
| 7,142,779 B2 | | 11/2006 | Schaeffer | |
| D588,275 S | | 3/2009 | Lozano | |
| 9,283,142 B1 | | 3/2016 | Lichti | |
| 10,010,477 B2 | | 7/2018 | Durfee | |
| 11,821,195 B1 | * | 11/2023 | Farber | E04B 1/6116 |
| 2008/0196152 A1 | | 8/2008 | Lozano | |
| 2009/0044311 A1 | * | 2/2009 | Lipponen | A61H 33/10 2/202 |
| 2009/0299329 A1 | * | 12/2009 | Dixon | A61M 16/0627 604/514 |
| 2013/0042402 A1 | * | 2/2013 | Parker | A61H 33/066 4/524 |
| 2016/0015597 A1 | | 1/2016 | Richards | |
| 2019/0015624 A1 | * | 1/2019 | Hill | E04H 4/108 |
| 2021/0189757 A1 | * | 6/2021 | Liu | E04H 15/12 |
| 2024/0229497 A1 | * | 7/2024 | Xu | E04H 15/425 |

FOREIGN PATENT DOCUMENTS

| | | |
|---|---|---|
| CA | 2403055 | 12/2003 |

* cited by examiner

*Primary Examiner* — Christine J Skubinna

(57) ABSTRACT

A portable sauna assembly for facilitating a user to enjoy a sauna while the user is travelling includes a sauna tent that has an entrance and a neck opening. A plurality of heating panels is integrated into the sauna tent to heat the user when the user is inside of the sauna tent. Additionally, each of the heating panels is foldable when the sauna tent is collapsed. A control unit is in communication with each of the plurality of heating panels for controlling operational parameters of the plurality of heating panels. A remote control is in communication with the control unit such that the remote control can be manipulated by the user for controlling the plurality of heating panels.

7 Claims, 6 Drawing Sheets

PORTABLE SAUNA ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable.

STATEMENT REGARDING PRIOR DISCLOSURES BY THE INVENTOR OR JOINT INVENTOR

Not Applicable.

BACKGROUND OF THE INVENTION

(1) Field of the Invention

The disclosure relates to sauna devices and more particularly pertains to a new sauna device for facilitating a user to enjoy a sauna while the user is travelling. The device includes a sauna tent and a plurality of heating panels that are integrated into the sauna tent; each of the plurality of heating panels are foldable in half to facilitate the sauna tent and the plurality of heating panels to be folded and subsequently placed in a suitcase for transporting the sauna tent and the plurality of heating panels.

(2) Description of Related Art Including Information Disclosed Under 37 CFR 1.97 and 1.98

The prior art relates to sauna devices including a variety of portable sauna devices that each at least includes a sauna tent and means of heating an interior of the sauna tent which includes infra-red emitters, steam heaters and electric heaters. In no instance does the prior art disclose a sauna tent that includes a plurality of infra-red heating panels that are integrated into the sauna tent and which are foldable to facilitate the sauna tent and the heating panels to be placed in a suitcase for transporting the sauna tent and the heating panels.

BRIEF SUMMARY OF THE INVENTION

An embodiment of the disclosure meets the needs presented above by generally comprising a sauna tent that has an entrance and a neck opening. A plurality of heating panels is integrated into the sauna tent to heat the user when the user is inside of the sauna tent. Additionally, each of the heating panels is foldable when the sauna tent is collapsed. A control unit is in communication with each of the plurality of heating panels for controlling operational parameters of the plurality of heating panels. A remote control is in communication with the control unit such that the remote control can be manipulated by the user for controlling the plurality of heating panels.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
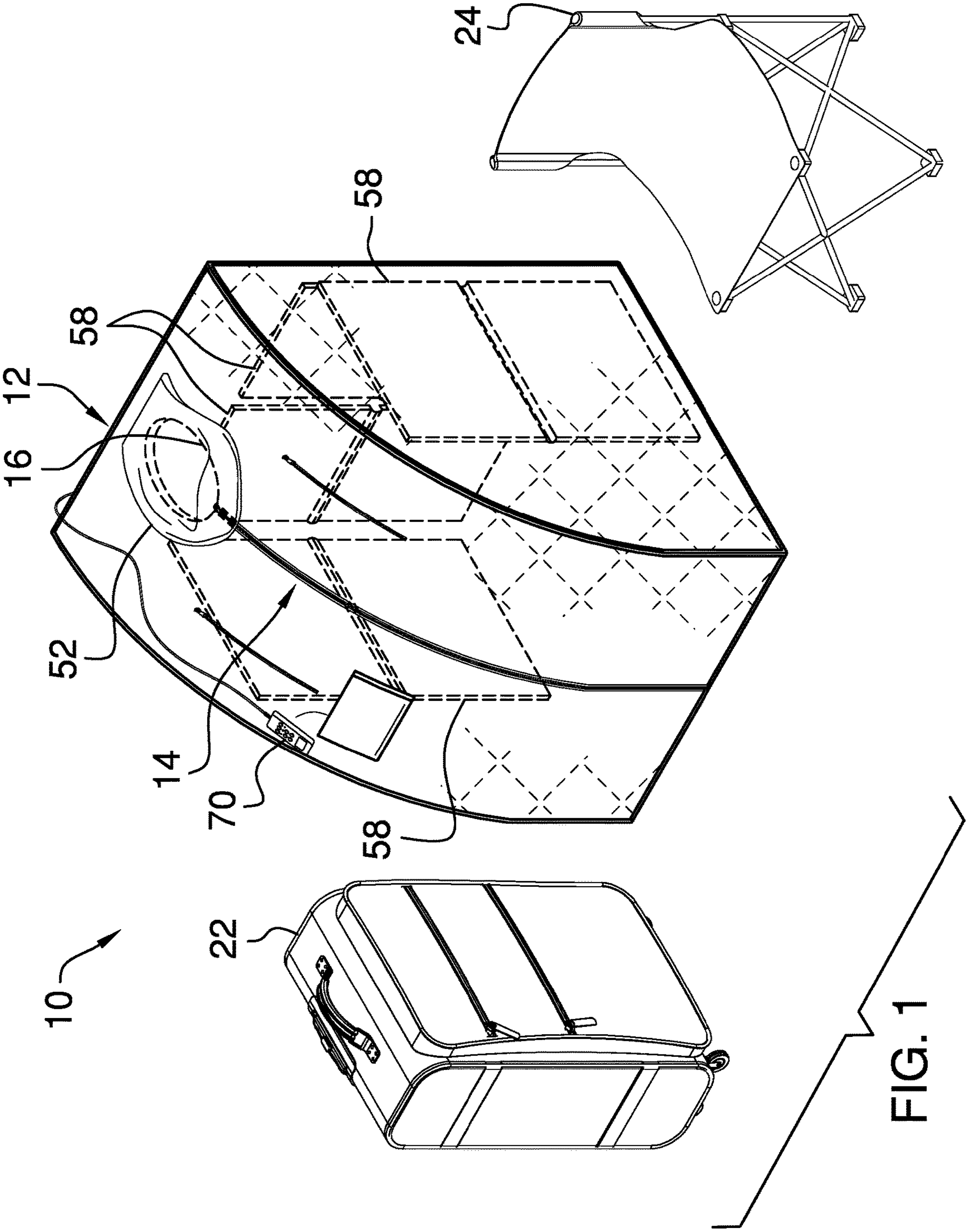
FIG. 1 is a perspective view of a portable sauna assembly according to an embodiment of the disclosure.
Figure 2:
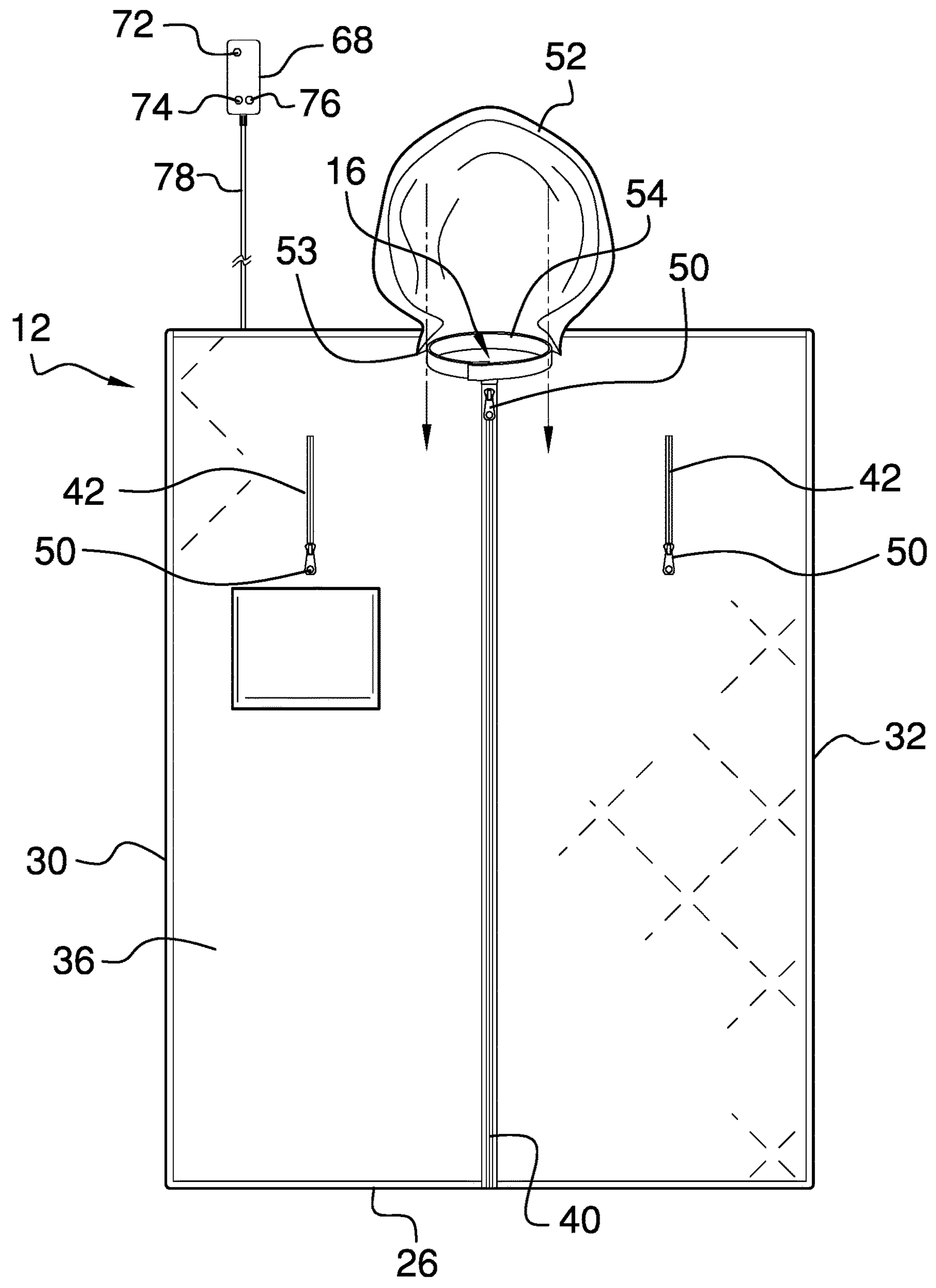
FIG. 2 is a front view of a sauna tent of an embodiment of the disclosure.
Figure 3:
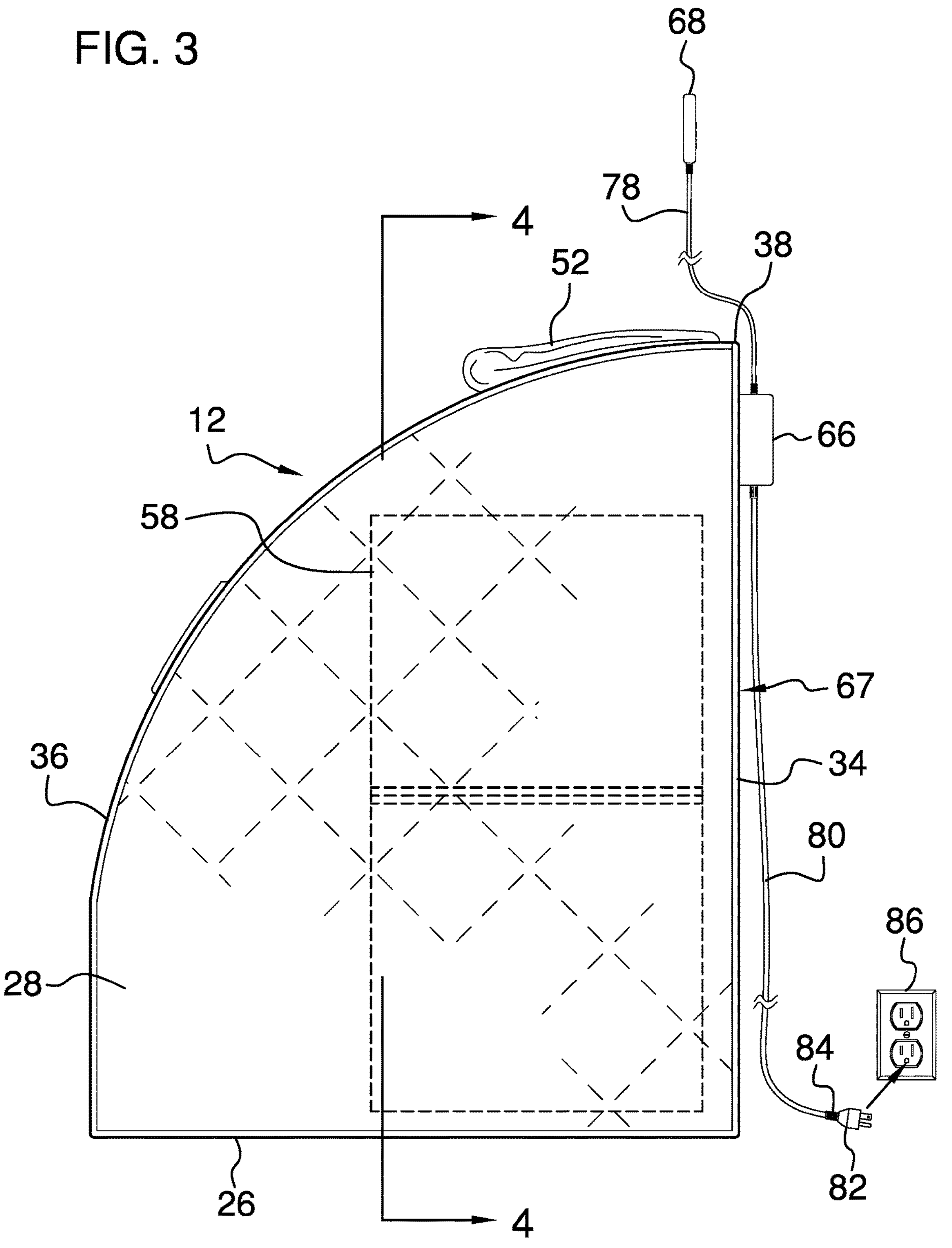
FIG. 3 is a left side view of a sauna tent of an embodiment of the disclosure.
Figure 4:
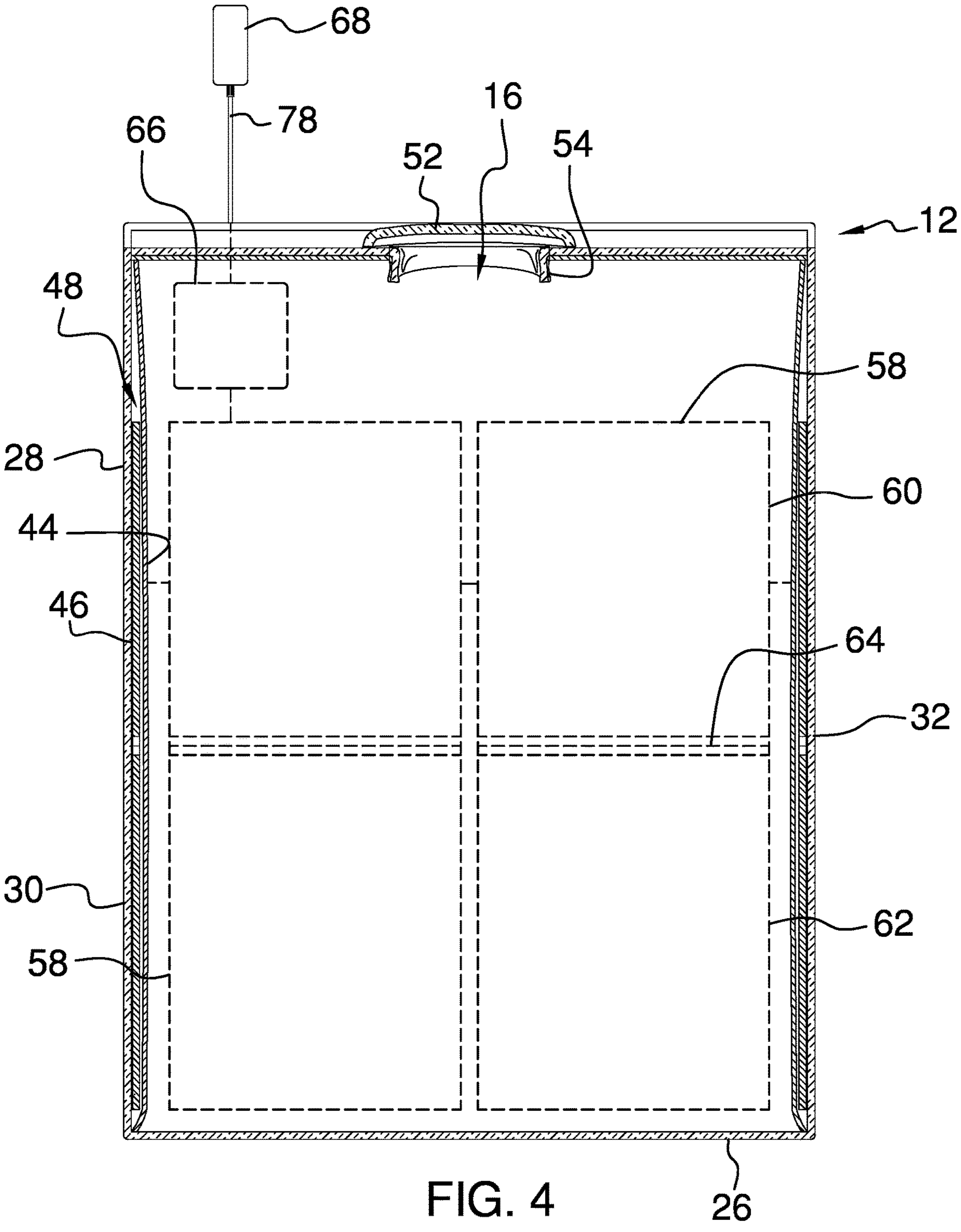
FIG. 4 is a cross sectional view taken along line 4-4 of FIG. 3 of an embodiment of the disclosure.
Figure 5:
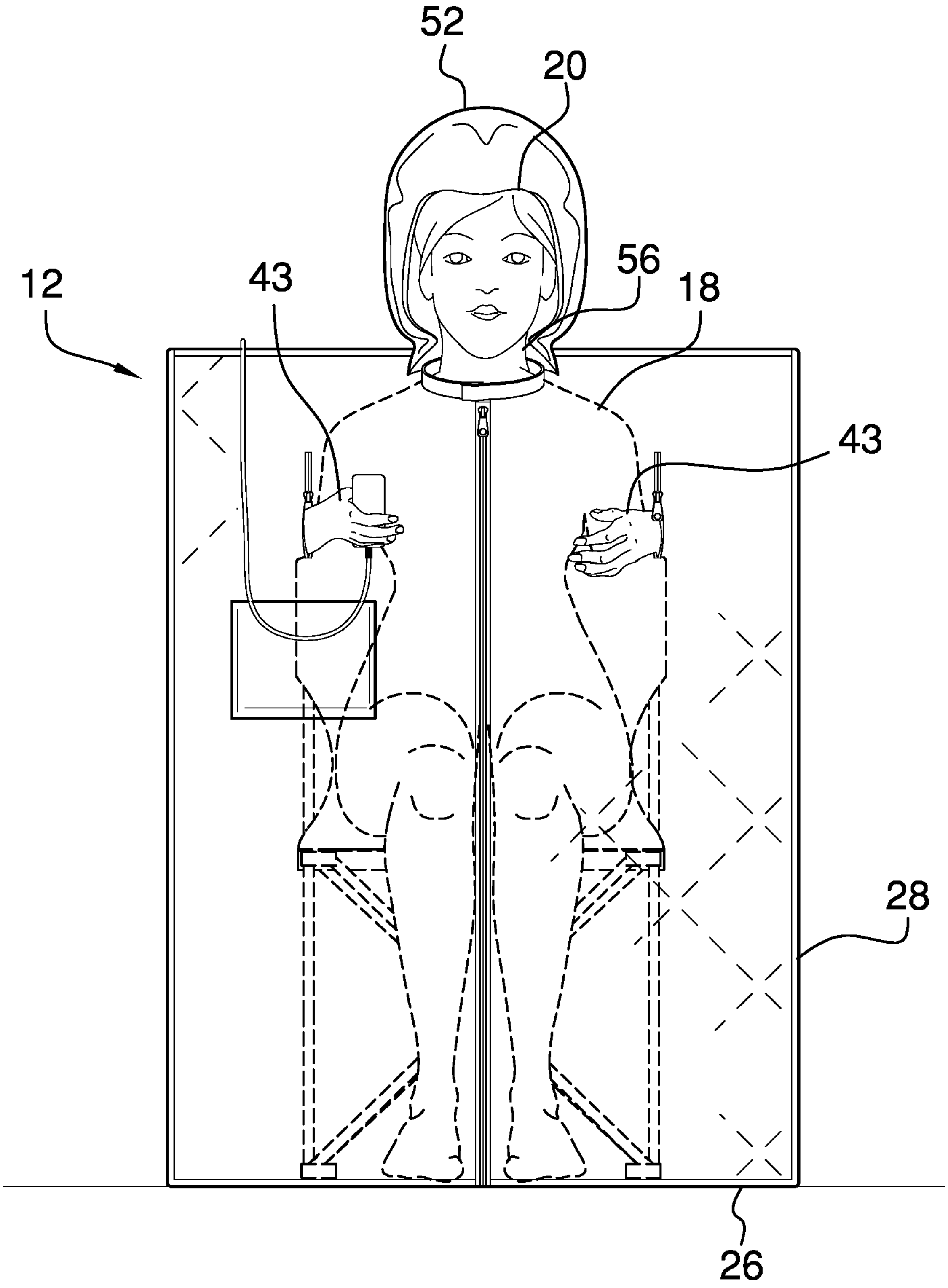
FIG. 5 is a perspective in-use view of an embodiment of the disclosure.
Figure 6:
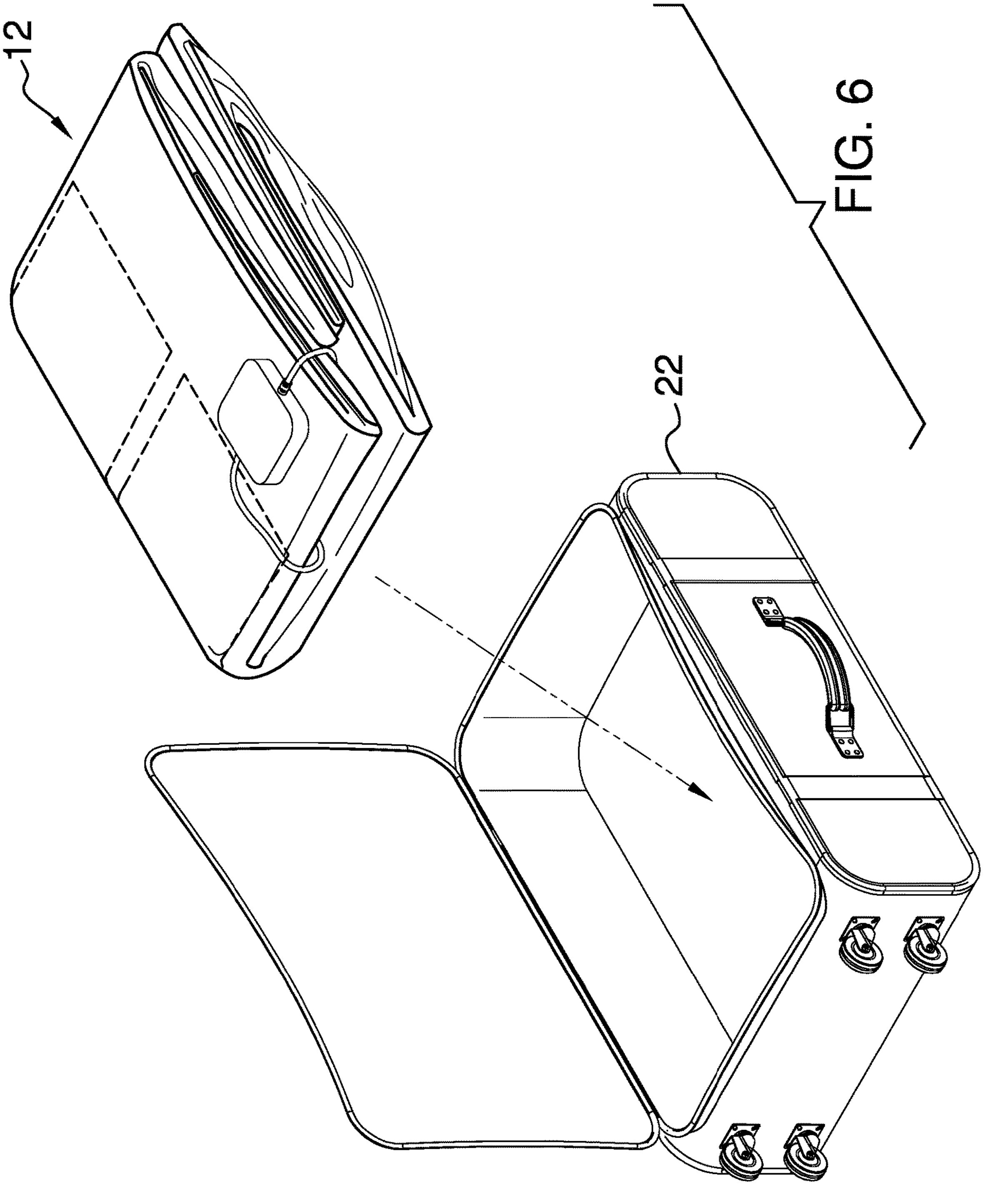
FIG. 6 is an exploded perspective view of an embodiment of the disclosure showing a sauna tent being positioned in a suitcase.

With reference now to the drawings, and in particular to FIGS. 1 through 6 thereof, a new sauna device embodying the principles and concepts of an embodiment of the disclosure and generally designated by the reference numeral 10 will be described.

As best illustrated in FIGS. 1 through 6, the portable sauna assembly 10 generally comprises a sauna tent 12 which has an entrance 14 and a neck opening 16. The entrance 14 facilitates a user 18 to enter the sauna tent 12 and the neck opening 16 facilitates the user's head 20 to be exposed when the user 18 is positioned within the sauna tent 12. The sauna tent 12 is comprised of a fluid impermeable material to inhibit fluid communication between an interior of the sauna tent 12 and ambient air. Additionally, the sauna tent 12 is comprised of a deformable material thereby facilitating the sauna tent 12 to be folded for storage. A suitcase 22 is included for storing the sauna tent 12 when the sauna tent 12 is folded to facilitate the sauna tent 12 to be transported when the user 18 is travelling. Furthermore, a folding chair 24 is included that can be positioned inside of the sauna tent 12 when the sauna tent 12 is deployed to facilitate the user 18 to be seated in the sauna tent 12.

The sauna tent 12 has a bottom wall 26 and an outer wall 28 extending upwardly from the bottom wall 26 and the outer wall 28 has a first lateral side 30, a second lateral side 32, a back side 34 and a front side 36. The front side 36 curves rearwardly between the bottom wall 26 and the back side 34 such that the front side 36 intersects the back side 34 at a top edge 38 of the back side 34 thereby facilitating the each of the first lateral side 30 and the second lateral side 32 to approximately define a quadrant of a circle. The neck opening 16 extends through the front side 36 of the outer wall 28 and the neck opening 16 is spaced from the top edge 38 of the back side 34. The front side 36 has a first cut 40 extending between the bottom wall 26 and the neck opening 16 such that first cut 40 defines the entrance 14 and the first cut 40 is centrally located on the front side 36. The sauna tent 12 has a pair of second cuts 42 each extending through the front side 36 and each of the second cuts 42 is positioned between the first cut 40 and a respective one of the first lateral side 30 and the second lateral side 32 of the outer wall 28. In this way each of the pair of second cuts 42 facilitates the user 18 to extend each of their hands 43 outwardly through a respective one of the second cuts 42. Each of the second cuts 42 is positioned closer to the back side 34 than the bottom wall 26. Additionally, the sauna tent 12 may have a height ranging between approximately 88.0 cm and 100.0 cm, a width ranging between approximately 70.0 cm and 80.0 cm and a depth ranging between approximately 75.0 cm and 88.0 cm.

Each of the back side 34 and the first lateral side 30 and the second lateral side 32 has an inner layer 44 and an outer layer 46 to define a storage space 48 between the inner layer 44 and the outer layer 46 corresponding to each of the back side 34 and the first lateral side 30 and the second lateral side 32. A plurality of closures 50 is attached to the sauna tent 12 and each of the plurality of closures 50 extends along a respective one of the first cut 40 and the pair of second cuts 42. Each of the closures 50 is manipulatable between a closed condition or an open condition for closing or opening the respective first cut 40 and the pair of second cuts 42. Additionally, each of the closures 50 may comprise a zipper, a set of hook and loop fasteners or any other type of closure that can be opened and closed on a repeat basis.

A hood 52 is coupled to the sauna tent 12 and the hood 52 is aligned with the neck opening 16 such that the hood 52 can be worn over the user's head 20 when the user's head 20 extends outwardly through the neck opening 16 in the sauna tent 12. The hood 52 has a lower edge 53 which is attached to the top edge 38 of the back side 34 of the outer wall 28. The hood 52 is positionable in a first position has the hood 52 extending over the neck opening 16 thereby closing the neck opening 16 and the hood 52 is positionable in a second position has the hood 52 extending upwardly from the top edge 38 of the back side 34 of the outer wall 28. A collar 54 is attached to the front side 36 of the outer wall 28 of the sauna tent 12 having the collar 54 extending around the neck opening 16. In this way the collar 54 can be worn around the user's neck 56 when the user's head 20 extends through the neck opening 16.

A plurality of heating panels 58 is included and each of the plurality of heating panels 58 is integrated into the sauna tent 12 such that each of the plurality of heating panels 58 is in thermal communication with the interior of the sauna. Each of the plurality of heating panels 58 generates heat when the plurality of heating panels 58 is turned on. In this way each of the plurality of heating panels 58 can heat the user 18 when the user 18 is inside of the sauna tent 12. Each of the heating panels 58 is foldable when the sauna tent 12 is collapsed. Each of the heating panels 58 includes an upper panel 60, a lower panel 62 and a folding element 64 extending between the upper panel 60 and the lower panel 62 thereby facilitating each of the heating panels 58 to be folded along the folding element 64.

Each of the plurality of heating panels 58 is positioned between the inner layer 44 and the outer layer 46 of the outer wall 28. Furthermore, each of the plurality of heating panels 58 is positioned on a respective one of the first lateral side 30 and the second lateral side 32 and the back side 34 of the outer wall 28. Each of the plurality of heating panels 58 comprises an infra-red heating panel with an output capacity sufficient to heat the interior of the sauna tent 12 to a temperature ranging between approximately 120.0 degrees Fahrenheit and 130.0 degrees Fahrenheit. Furthermore, the folding element 64 associated with each of the plurality of heating panels 58 may comprise a hinge, a membrane extending between the upper panel 60 and the lower panel 62 or any other type of deformable material that is structurally integrated into the plurality of heating panels 58 to facilitate the upper panel 60 to be positioned against the lower panel 62 when the heating panels 58 are folded.

A control unit 66 is attached to the sauna tent 12 and the control unit 66 is in communication with each of the plurality of heating panels 58 for controlling operational parameters of the plurality of heating panels 58. The control unit 66 is mounted to an outer surface 67 of the back side 34 of the outer wall 28 of the sauna tent 12 at a point located closer to the top edge 38 of the back side 34 than the bottom wall 26 of the sauna tent 12. Furthermore, the control unit 66 is positioned closer to the first lateral side 30 of the outer wall 28 than the second lateral side 32 of the outer wall 28. The control unit 66 includes circuitry commonly associated with control systems for infra-red heating devices.

A remote control 68 is in communication with the control unit 66 such that the remote control 68 can be manipulated by the user 18 for controlling the plurality of heating panels 58. The remote control 68 has a plurality of buttons 70 movably disposed on the remote control 68. The plurality of buttons 70 include, but is not limited to, a power button 72, a temperature increase button 74 for adjusting an operational temperature of the plurality of heating panels 58 toward a maximum temperature and a temperature decrease button 76 for adjusting the operational temperature of the plurality of heating panels 58 toward a minimum temperature. A conductor 78 is electrically coupled between the remote control 68 and the control unit 66 thereby placing the remote control 68 in electrical communication with the control unit 66. A power cord 80 is electrically coupled to and extending away from the control unit 66. The power cord 80 has a male plug 82 that is disposed on a distal end 84 of the power cord 80 to facilitate the male plug 82 to be plugged into a power source 86 comprising a female electrical outlet.

In use, the sauna tent 12 is unfolded, each of the heating panels 58 is unfolded, the folding chair 24 is placed within the sauna tent 12 and the user 18 enters the sauna tent 12 through the entrance 14. The user 18 closes the entrance 14, sits on the folding chair 24, extends their head through the neck opening 16 and extends each of their hands 43 outwardly through the respective second cuts 42 in the outer wall 28 of the sauna. In this way the user 18 can apply the hood 52 over their head and manipulate the remote control 68. The buttons 70 on the remote control 68 are manipulated to turn on the plurality of heating panels 58 and to adjust the temperature of the plurality of heating panels 58. In this way the user 18 can enjoy a sauna while the user 18 is staying in a hotel, for example, regardless of whether the hotel has a sauna facility on site. Each of the plurality of heating panels 58 is folded, the sauna tent 12 is folded and the sauna tent 12 and heating panels 58 are placed within the suitcase 22 to facilitate the sauna tent 12 and the plurality of heating panels 58 to be transported.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable sauna assembly to facilitate a user to enjoy a sauna while the user is travelling, said assembly comprising:

a sauna tent having an entrance and a neck opening wherein said entrance is configured to facilitate a user to enter said sauna tent and wherein said neck opening is configured to facilitate the user's head to be exposed when the user is positioned within said sauna tent, said sauna tent being comprised of a fluid impermeable material wherein said sauna tent is configured to inhibit fluid communication between an interior of said sauna tent and ambient air;

a hood being coupled to said sauna tent, said hood being aligned with said neck opening wherein said hood is configured to be worn over the user's head when the user's head extends outwardly through said neck opening in said sauna tent;

a plurality of heating panels, each of said plurality of heating panels being integrated into said sauna tent wherein each of said plurality of heating panels is configured to be in thermal communication with said interior of said sauna, each of said plurality of heating panels generating heat when said plurality of heating panels is turned on wherein each of said plurality of panels is configured to heat the user when the user in inside of said sauna tent, each of said heating panels being foldable when said sauna tent is collapsed;

a control unit being attached to said sauna tent, said control unit being in communication with each of said plurality of heating panels for controlling operational parameters of said plurality of heating panels; and a remote control being in communication with said control unit wherein said remote control is configured to be manipulated by the user for controlling said plurality of heating panels;

wherein said sauna tent has a bottom wall and an outer wall extending upwardly from said bottom wall, said outer wall having a first lateral side, a second lateral side, a back side and a front side, said front side curving rearwardly between said bottom wall and said back side such that said front side intersects said back side at a top edge of said back side thereby facilitating said each of said first lateral side and said second lateral side to approximately define a quadrant of a circle;

wherein said neck opening extends through said front side of said outer wall, said neck opening being spaced from said top edge of said back side;

wherein said front side has a first cut extending between said bottom wall and said neck opening such that first cut defines said entrance, said first cut being centrally located on said front side;

wherein said sauna tent has a pair of second cuts each extending through said front side, each of said second cuts being positioned between said first cut and a respective one of said first lateral side and said second lateral side of said outer wall wherein each of said pair of second cuts is configured to facilitate the user to extend each of their hands outwardly through a respective one of said second cuts, each of said second cuts being positioned closer to said back side than said bottom wall; and wherein each of said back side and said first lateral side and said second lateral side has an inner layer and an outer layer to define a storage space between said inner layer and said outer layer corresponding to each of said back side and said first lateral side and said second lateral side; and wherein said hood has a lower edge being attached to said top edge of said back side of said outer wall, said hood being positionable in a first position having said hood extending over said neck opening thereby closing said neck opening, said hood being positionable in a second position having said hood extending upwardly from said top edge of said back side of said outer wall.

2. The assembly according to claim 1, further comprising a plurality of closures, each of said plurality of closures being attached to said sauna tent, each of said plurality of closures extending along a respective one of said first cut and said pair of second cuts, each of said closures being manipulatable between a closed condition or an open condition for closing or opening said respective first cut and said pair of second cuts.

3. The assembly according to claim 1, further comprising a collar being attached to said front side of said outer wall of said sauna tent having said collar extending around said neck opening wherein said collar is configured to be worn around the user's neck when the user's head extends through said neck opening.

4. A portable sauna assembly to facilitate a user to enjoy a sauna while the user is travelling, said assembly comprising:

a sauna tent having an entrance and a neck opening wherein said entrance is configured to facilitate a user to enter said sauna tent and wherein said neck opening is configured to facilitate the user's head to be exposed when the user is positioned within said sauna tent, said sauna tent being comprised of a fluid impermeable material wherein said sauna tent is configured to inhibit fluid communication between an interior of said sauna tent and ambient air;

a hood being coupled to said sauna tent, said hood being aligned with said neck opening wherein said hood is configured to be worn over the user's head when the user's head extends outwardly through said neck opening in said sauna tent;

a plurality of heating panels, each of said plurality of heating panels being integrated into said sauna tent wherein each of said plurality of heating panels is configured to be in thermal communication with said interior of said sauna, each of said plurality of heating panels generating heat when said plurality of heating panels is turned on wherein each of said plurality of panels is configured to heat the user when the user in inside of said sauna tent, each of said heating panels being foldable when said sauna tent is collapsed;

a control unit being attached to said sauna tent, said control unit being in communication with each of said plurality of heating panels for controlling operational parameters of said plurality of heating panels; and a remote control being in communication with said control unit wherein said remote control is configured to be manipulated by the user for controlling said plurality of heating panels;

wherein said sauna tent has a bottom wall and an outer wall extending upwardly from said bottom wall, said outer wall having a first lateral side, a second lateral side, a back side and a front side, said front side curving rearwardly between said bottom wall and said back side such that said front side intersects said back side at a top edge of said back side thereby facilitating said each of said first lateral side and said second lateral side to approximately define a quadrant of a circle;

wherein said neck opening extends through said front side of said outer wall, said neck opening being spaced from said top edge of said back side;

wherein said front side has a first cut extending between said bottom wall and said neck opening such that first cut defines said entrance, said first cut being centrally located on said front side;

wherein said sauna tent has a pair of second cuts each extending through said front side, each of said second cuts being positioned between said first cut and a respective one of said first lateral side and said second lateral side of said outer wall wherein each of said pair of second cuts is configured to facilitate the user to extend each of their hands outwardly through a respective one of said second cuts, each of said second cuts being positioned closer to said back side than said bottom wall; and wherein each of said back side and said first lateral side and said second lateral side has an inner layer and an outer layer to define a storage space between said inner layer and said outer layer corresponding to each of said back side and said first lateral side and said second lateral side; and wherein each of said heating panels includes an upper panel and a lower panel and a folding element extending between said upper panel and said lower panel thereby facilitating each of said heating panels to be folded along said folding element, each of said plurality of heating panels being positioned between said inner layer and said outer layer of said outer wall, each of said plurality of heating panels being positioned on a respective one of said first lateral side and said second lateral side and said back side of said outer wall.

5. The assembly according to claim 1, wherein said remote control has a plurality of buttons being movably disposed on said remote control, said plurality of buttons including a power button, a temperature increase button for adjusting an operational temperature of said plurality of heating panels toward a maximum temperature and a temperature decrease button for adjusting the operational temperature of said plurality of heating panels toward a minimum temperature.

6. The assembly according to claim 1, further comprising:

a conductor being electrically coupled between said remote control and said control unit thereby placing said remote control in electrical communication with said control unit; and a power cord being electrically coupled to and extending away from said control unit, said power cord having a male plug being disposed on a distal end of said power cord wherein said male plug is configured to be plugged into a power source comprising a female electrical outlet.

7. A portable sauna assembly to facilitate a user to enjoy a sauna while the user is travelling, said assembly comprising:

a sauna tent having an entrance and a neck opening wherein said entrance is configured to facilitate a user to enter said sauna tent and wherein said neck opening is configured to facilitate the user's head to be exposed when the user is positioned within said sauna tent, said sauna tent being comprised of a fluid impermeable material wherein said sauna tent is configured to inhibit fluid communication between an interior of said sauna tent and ambient air, said sauna tent having a bottom wall and an outer wall extending upwardly from said bottom wall, said outer wall having a first lateral side, a second lateral side, a back side and a front side, said front side curving rearwardly between said bottom wall and said back side such that said front side intersects said back side at a top edge of said back side thereby facilitating said each of said first lateral side and said second lateral side to approximately define a quadrant of a circle, said neck opening extending through said front side of said outer wall, said neck opening being spaced from said top edge of said back side, said front side having a first cut extending between said bottom wall and said neck opening such that first cut defines said entrance, said first cut being centrally located on said front side, said sauna tent having a pair of second cuts each extending through said front side, each of said second cuts being positioned between said first cut and a respective one of said first lateral side and said second lateral side of said outer wall wherein each of said pair of second cuts is configured to facilitate the user to extend each of their hands outwardly through a respective one of said second cuts, each of said second cuts being positioned closer to said back side than said bottom wall, each of said back side and said first lateral side and said second lateral side having an inner layer and an outer layer to define a storage space between said inner layer and said outer layer corresponding to each of said back side and said first lateral side and said second lateral side;

a plurality of closures, each of said plurality of closures being attached to said sauna tent, each of said plurality of closures extending along a respective one of said first cut and said pair of second cuts, each of said closures being manipulatable between a closed condition or an open condition for closing or opening said respective first cut and said pair of second cuts;

a hood being coupled to said sauna tent, said hood being aligned with said neck opening wherein said hood is configured to be worn over the user's head when the user's head extends outwardly through said neck opening in said sauna tent, said hood having a lower edge being attached to said top edge of said back side of said outer wall, said hood being positionable in a first position having said hood extending over said neck opening thereby closing said neck opening, said hood being positionable in a second position having said hood extending upwardly from said top edge of said back side of said outer wall;

a collar being attached to said front side of said outer wall of said sauna tent having said collar extending around said neck opening wherein said collar is configured to be worn around the user's neck when the user's head extends through said neck opening;

a plurality of heating panels, each of said plurality of heating panels being integrated into said sauna tent wherein each of said plurality of heating panels is configured to be in thermal communication with said interior of said sauna, each of said plurality of heating panels generating heat when said plurality of heating panels is turned on wherein each of said plurality of panels is configured to heat the user when the user in inside of said sauna tent, each of said heating panels being foldable when said sauna tent is collapsed, each of said heating panels including an upper panel and a lower panel and a folding element extending between said upper panel and said lower panel thereby facilitating each of said heating panels to be folded along said folding element, each of said plurality of heating panels being positioned between said inner layer and said outer layer of said outer wall, each of said plurality of heating panels being positioned on a respective one of said first lateral side and said second lateral side and said back side of said outer wall;

a control unit being attached to said sauna tent, said control unit being in communication with each of said plurality of heating panels for controlling operational parameters of said plurality of heating panels, said control unit being mounted to an outer surface of said back side of said outer wall of said sauna tent at a point located closer to said top edge of said back side than said bottom wall of said sauna tent, said control unit being positioned closer to said first lateral side of said outer wall than said second lateral side of said outer wall;

a remote control being in communication with said control unit wherein said remote control is configured to be manipulated by the user for controlling said plurality of heating panels, said remote control having a plurality of buttons being movably disposed on said remote control, said plurality of buttons including a power button, a temperature increase button for adjusting an operational temperature of said plurality of heating panels toward a maximum temperature and a temperature decrease button for adjusting the operational temperature of said plurality of heating panels toward a minimum temperature;

a conductor being electrically coupled between said remote control and said control unit thereby placing said remote control in electrical communication with said control unit; and a power cord being electrically coupled to and extending away from said control unit, said power cord having a male plug being disposed on a distal end of said power cord wherein said male plug is configured to be plugged into a power source comprising a female electrical outlet.

* * * * *